(12) United States Patent
Subedar et al.

(10) Patent No.: US 8,724,022 B2
(45) Date of Patent: May 13, 2014

(54) FRAME RATE CONVERSION USING MOTION ESTIMATION AND COMPENSATION

(75) Inventors: Mahesh Subedar, Laveen, AZ (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 12/614,518

(22) Filed: Nov. 9, 2009

(65) Prior Publication Data

US 2011/0109796 A1 May 12, 2011

(51) Int. Cl.
*H04N 7/01* (2006.01)
*H04N 11/20* (2006.01)

(52) U.S. Cl.
USPC .......................................... 348/459; 348/452

(58) Field of Classification Search
USPC .......... 348/402.1, 441–459; 375/240, 240.16, 375/240.24
See application file for complete search history.

(56) References Cited

U.S. PATENT DOCUMENTS

| | | | | |
|---|---|---|---|---|
| 6,130,964 | A * | 10/2000 | Marques et al. | 382/236 |
| 7,342,963 | B2 * | 3/2008 | Laurent-Chatenet et al. | 375/240.16 |
| 7,868,946 | B2 * | 1/2011 | Ha | 348/416.1 |
| 2004/0252763 | A1 * | 12/2004 | Mertens | 375/240.16 |
| 2006/0013307 | A1 * | 1/2006 | Olivier et al. | 375/240.16 |
| 2007/0076795 | A1 * | 4/2007 | Lee | 375/240.16 |
| 2008/0095239 | A1 * | 4/2008 | Lim et al. | 375/240.16 |
| 2008/0204592 | A1 * | 8/2008 | Jia et al. | 348/402.1 |
| 2009/0002558 | A1 * | 1/2009 | Lidberg | 348/607 |
| 2009/0153733 | A1 * | 6/2009 | Shin et al. | 348/459 |

FOREIGN PATENT DOCUMENTS

| | | |
|---|---|---|
| EP | 1164792 | 8/2003 |
| EP | 1638339 | 12/2006 |
| EP | 1234447 | 8/2008 |
| EP | 2106136 | 9/2009 |

OTHER PUBLICATIONS

British Patent Office, Combined Search and Examination Report issued in corresponding GB App. No. GB1016032.3, dated Jan. 21, 2011, 8 pgs.
Kang, Suk-Ju et al., "Motion Compensated Frame Rate Up-Conversion Using Extended Bilateral Motion Estimation", IEEE Transactions on Consumer Electronics, vol. 53, No. 4, Nov. 2007, pp. 1759-1767.
Lee, Jae Hun et al., "A Fast Multi-Resolution Block Matching Algorithm and its LSI Architecture for Low Bit-Rate Video Coding", IEEE Transactions on Circuits and Systems for Video Technology, vol. 11, No. 12, Dec. 2001, pp. 1289-1301.

* cited by examiner

*Primary Examiner* — Michael Lee
(74) *Attorney, Agent, or Firm* — Trop, Pruner & Hu, P.C.

(57) ABSTRACT

Frame rate conversion may be implemented using motion estimation results. Specifically, as part of the motion estimation, pixels may be labeled based on the number of matching pixels in subsequent frames. For example, pixels may be labeled as to whether they have no matching pixels, one matching pixels, or multiple matching pixels. The motion estimation and pixel labeling may then be used to interpolate pixels for frame rate conversion.

27 Claims, 4 Drawing Sheets

FRAME RATE CONVERSION USING MOTION ESTIMATION AND COMPENSATION

BACKGROUND

This relates generally to processing video information.

Video may be supplied with a given frame rate. The video is made up of a sequence of still frames. The frame rate is the number of frames per second.

Some displays use frame rates different than the frame rate of the input video. Thus, frame rate conversion converts the frame rate up or down so that the input frame rate matches the display's frame rate.

DETAILED DESCRIPTION

Frame rate conversion is used to change the frame rate of a video sequence. A typical frame rate conversion algorithm application is to convert film content from 24 frames per second to 60 frames per second for the National Television Systems Committee (NTSC) system or from 25 frames per second to 50 frames per second for the phase alternating line (PAL) system. High definition television support 120 or 240 frames per second display, which also needs frame rate up conversion. In accordance with some embodiments, the frame rate conversion algorithm may compensate for the motion depicted in the video sequence.

In one embodiment, bi-directional, hierarchical motion estimation and motion compensation is used. "Bi-directional" means that the motion is estimated between the same two anchor frames (called previous and next frames herein) in the forward and backward directions. Hierarchical motion estimation refers to the fact that the motion estimation is refined with increasing resolution of the supplied video information. The bi-directional hierarchical motion estimation and compensation may be followed by a final interpolation stage that takes care of the various issues that arise from the motion estimation and compensation stage to improve the quality of the interpolated picture.

Figure 1:
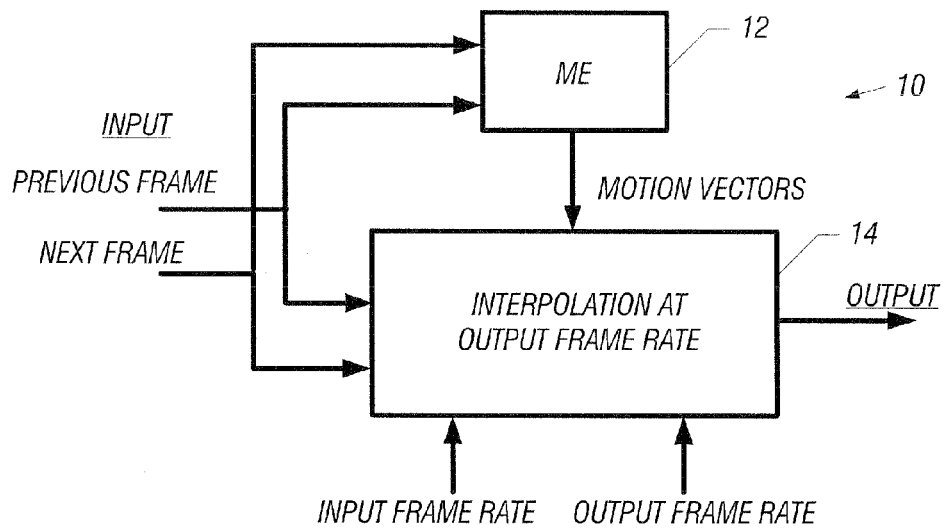
FIG. 1 is a schematic depiction of one embodiment of the present invention.

Referring to FIG. 1, the frame rate conversion algorithm 10 includes a motion estimation block 12 and a frame interpolation block 14. Thus, an input previous frame may go to the blocks 12 and 14 as may an input next frame. The interpolation at the output frame rate 14 receives the input frame rate and the output frame rate. It also receives the motion vectors. Based on all of this information, it provides a frame rate correct output, as indicated.

Motion estimation is performed between two or more neighboring frames by matching regions from one frame to another. These matched regions are usually smaller rectangular blocks of pixels within the frame. A bi-directional motion estimation is performed to obtain two sets of motion vectors (one from the base frame to the next frame and one from the base frame to the previous frame). The use of bi-directional motion estimation may result in more reliable motion vectors in some embodiments. The final set of motion vectors is then used to interpolate frames at the correct time stamp. The time stamp is based on the frame rate.

Motion estimation calculates motion vectors that represent translational and rotational movement of depicted image objects within a sequence of video frames. Using a block matching technique, a single motion vector is obtained for an m×n block. A typical similarity measure is the sum of absolute differences (SAD) between blocks, but other similarity measures may also be used. All pixels within the rectangular block are assigned the same motion vector.

In some embodiments, the hierarchical motion estimation engine uses energy minimization based on absolute differences, resolution level, and distance to the search block. The hierarchical motion estimation may allow increasing the motion range by working independently on low resolution versions of the original video frames and progressively increasing the resolution in the position of the motion vectors, as well as a confidence in their values at the same time, in some embodiments.

Fast or intense motion frames may be detected, for example, when the motion estimation exceeds a threshold. Fast motion may be treated as special cases for interpolation in some embodiments. The user may set the motion vector confidence threshold level for the motion vectors. As motion increases, generally confidence decreases.

The motion estimation engine calculates motion vectors for blocks of size m×n at different resolution levels. At each resolution level, the motion vectors from a lower resolution level are refined within a search window. A cost function may be developed based on a distance weighted sum of absolute differences. The cost function may be used to calculate the minimum cost function. Preference may be given to motion vectors that are closer to a base motion vector over more distant motion vectors having the same cost. In some embodiments, this may avoid vector divergence. Pixels with similar color are given the same weight in one embodiment. Pixels closer to the center pixels may be given more preference, meaning they may have smaller weights in some embodiments. Generally, the closer motion vectors are more reliable.

Figure 2:
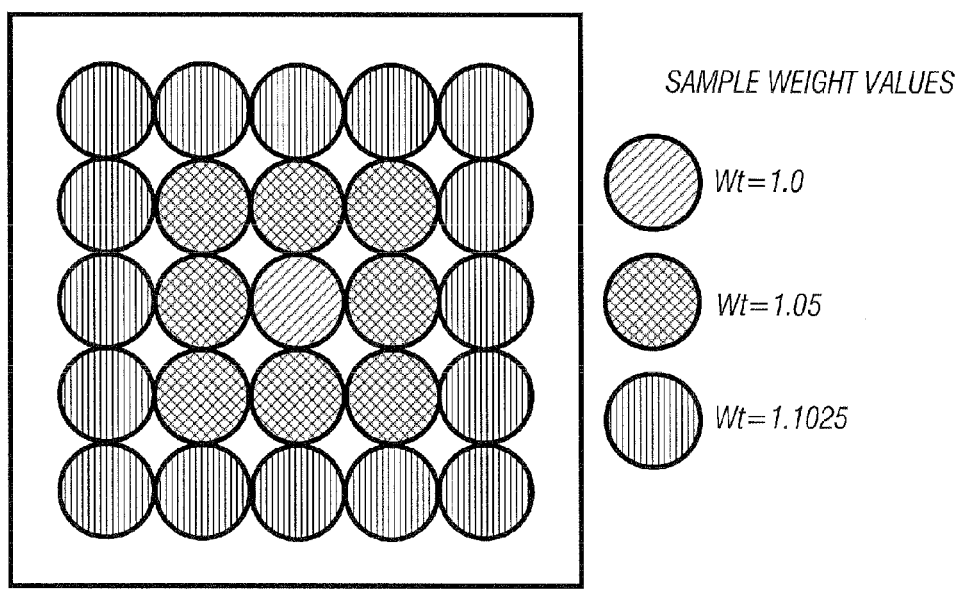
FIG. 2 is an indication of how motion estimation search location weights may be assigned to a block of pixels in accordance with one embodiment.

Thus, referring to FIG. 2, as an example, where m and n are 5, the base pixel is indicated as having weight factor (wt_factor)=1.0. The next surrounding pixels have a weight factor 1.05 in this example and the final set of surrounding pixels have a weight factor of 1.1025. Of course, this is only one example and different ways of assigning weights and the specific weights utilized may all be different.

The motion vectors may be calculated by minimizing a cost function that accounts for distance from a center pixel, as well as the sum of absolute differences over the search range. The sum of absolute difference cost function may be calculated for a window size of p×q as follows:

$$MV(dx, dy) = \mathrm{argmin}(SAD\_COST)$$

$$SAD\_COST = \left\{ \sum_{pq}^{lKx, lKy} AD << (AD >> step\_cnt) \right\} * Wt\_factor$$

where, AD is the absolute difference between corresponding pixel locations of the sum of absolute difference's window. Wt_factor is the weight factor and step_cnt is the separation between resolution levels. For example, a level of 5 corresponds to a resolution $\frac{1}{32}^{nd}$ of the original.

Figure 3:
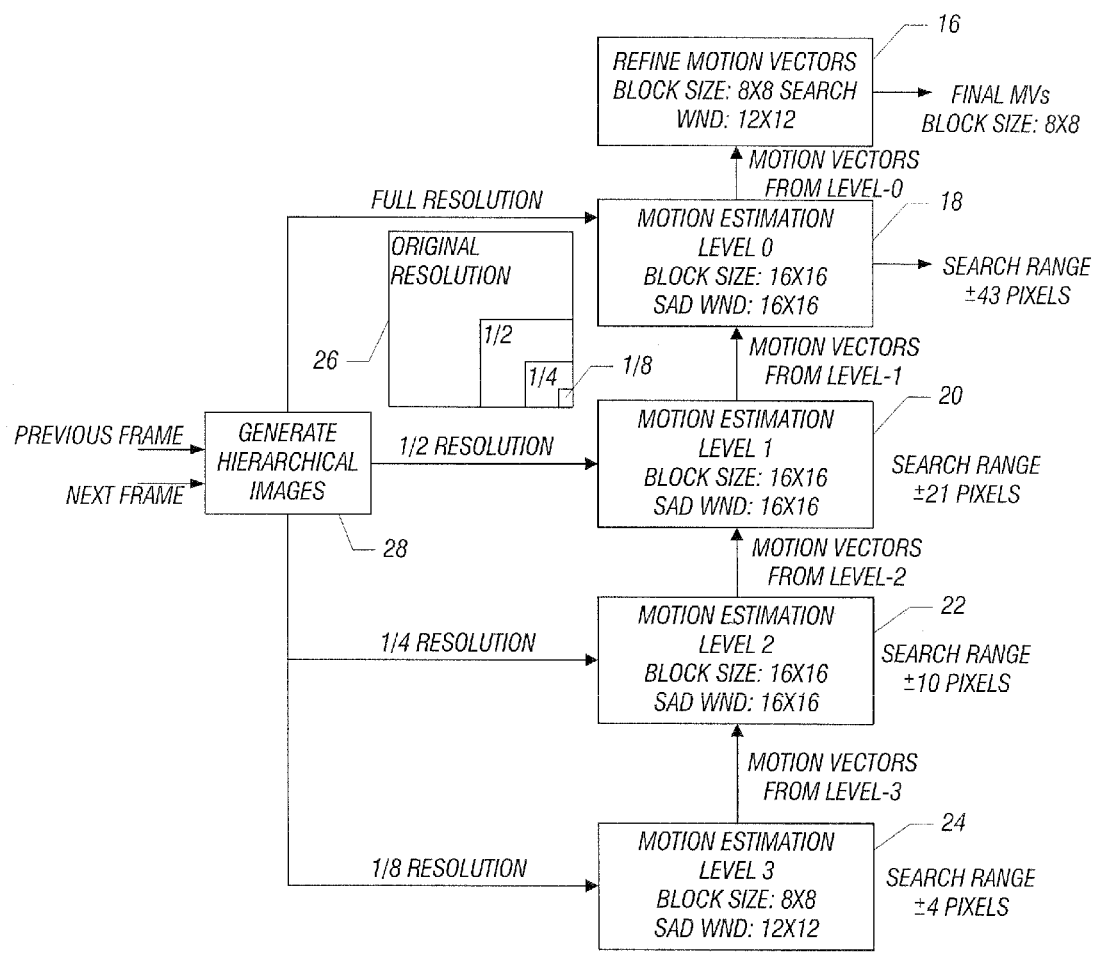
FIG. 3 is a flow chart for hierarchical motion estimation in accordance with one embodiment of the present invention.

Referring to FIG. 3, a sequence in accordance with one embodiment of the present invention may be implemented in hardware, software, or firmware. In software or firmware implemented embodiments, it may be made up of instructions that are executed by a computer. The instructions may be stored in a tangible computer readable medium such as an optical, magnetic or semiconductor memory.

Initially, the previous frame and next frame are used to generate hierarchical images, as indicated in block 28. The hierarchical images include in this four pass example, a full resolution image, a half resolution image, a quarter resolution image, and an eighth resolution image, as indicated at 26. The system starts at block 24 with the eighth resolution image.

At level 3, in this example, the block size is 8×8, which means there is one motion vector for every 8×8 set of pixels. The SAD window is a 12×12 window surrounding the 8×8 block. Thus, the search range is ±4 pixels and at every location a SAD of a 12×12 window is calculated. The motion vectors from level 3 are then provided to the motion estimation level 2, block 22, which receives the quarter resolution image. In this case, the search range may be ±10 pixels, as an example, the block size may be 16×16, and the search window may be 16×16.

The output from the motion estimation level 2, block 22 is provided to motion estimation level 1, block 20 which receives a half resolution image, as well as the motion vectors from level 2. The block size is 16×16 and the SAD window is 16×16, but the search range is ±21 pixels.

The level 1 motion estimation outputs motion vectors to a motion estimation level 0, block 18, which also receives the full resolution depiction. The block size is 16×16 and the SAD window is 16×16, but the search range is ±43 pixels. As indicated at 26, the full resolution depiction includes 75 percent more than the half resolution, which only includes a quarter of the original resolution. Similarly, the quarter resolution only receives a quarter of the resolution of the half resolution and the eighth resolution only receives a quarter of that.

The output from block 18 is then in the form of motion vectors which are provided to block 16 where the motion vectors are refined for a block size of 8×8 and a SAD window of 12×12 to produce motion vectors of size 8×8.

In hierarchical motion estimation, r motion estimation passes may be used, each with varying (e.g. increasing) resolution. As an example, a 4 pass hierarchical motion estimation may be used. The motion estimation starts with the coarsest level, denominated as a level 3 in this example and is refined at each subsequent step. The level 3 may correspond to a resolution $\frac{1}{8}^{th}$ of the original resolution. At the coarsest level, level r, the sum of absolute difference cost is calculated at every location within the search range of pixels. At this resolution level, the minimum sum of absolute difference cost and the next minimum sum of absolute difference cost may be obtained in one embodiment.

If the difference between these two costs is too small, then the best motion vectors from the neighboring blocks, at the same level, may be used for the present block, in some embodiments. The difference is too small if it is within a given percentage of the minimum sum of absolute difference in one embodiment.

As an example, the best motion vectors can be found from neighboring top and left blocks which were analyzed previously, in one embodiment. A top block is a block immediately over the subject block and the left block is the block immediately to the left of the subject block. If the motion vectors from a previous frame have been converted to motion fields, they can be considered as candidates to find the best motion vector as an extra check for consistency. They may have been converted to motion fields by keeping track of the four or five most common and most reliable motion vectors, in one embodiment.

This approach may be more powerful than recursive methods that may propagate errors or suffer from slow conversion transitions, in some cases.

At the next higher resolution level, r−1, the motion vectors from the lower level are refined within the search range of pixels. The refinement steps from level r−2 onwards using the best motion vectors from neighboring four lower resolution blocks. Thus, a group of blocks (top left, top right on one row and bottom left, and bottom right, directly below on the next row) may represent the four blocks that do not share the same motion vector from a lower resolution image.

The top left block chooses the best among the neighboring four blocks with the same pattern as the base motion vector. The base motion vector is then refined within the search range of pixels. These recursive steps are followed from level r−2 to level 0. After level 0 motion estimation, a refinement step may be applied to choose the best motion vector from the neighboring four motion vectors. This motion estimation step can be applied in both forward and backward directions to improve overall consistency and robustness of the motion vectors, in some embodiments. These bi-directional motion vectors may be used during the interpolation step.

The frame interpolation step includes interpolating the frames at the correct time stamp, usually to fill in the extra frames needed to make up the higher frame rate. Again, the time stamp is based on the frame rate. The frame interpolation step has three blocks, in one embodiment, a bi-directional motion compensation, hole filling, and interpolation. In the motion compensation step, the motion vectors obtained from the motion estimation engine are scaled to the correct time stamp before applying motion compensation.

At the motion compensation step, three different categories of pixels are identified and the identified pixels are given one of three labels. Pixels with no motion compensated value are labeled hole pixels. A hole pixel may occur for a pixel near the edge so that no pixel matches the hole pixel in the next frame. The hole pixel has the lowest confidence level. Pixels may also be associated with multiple motion vectors and are labeled many-to-one or M2O. They have the intermediate confidence level. One-to-one pixels (o2o) are pixels that match another pixel in the forward or reverse directions. These are the pixels with the highest confidence value.

In the case of many-to-one mapping pixels, the motion vectors may be refined based on the neighboring pixels. The forward and backward motion compensated images are calculated and a corresponding motion estimation error at each pixel is calculated, for example, as the sum of absolute differences of all three color components in a window of size p×q. For example, a 3×3 error calculation may be done where a set of nine pixels in a previous frame and nine pixels in the next frame are used to interpolate an intermediate pixel.

Pixels labeled as holes after the motion compensation step may be interpolated using neighbor pixel information in one embodiment. In the hole filling, the holes may be recursively filled from neighboring motion vectors. The motion vector with minimum sum of absolute difference cost may be used for the current pixel.

Figure 4:
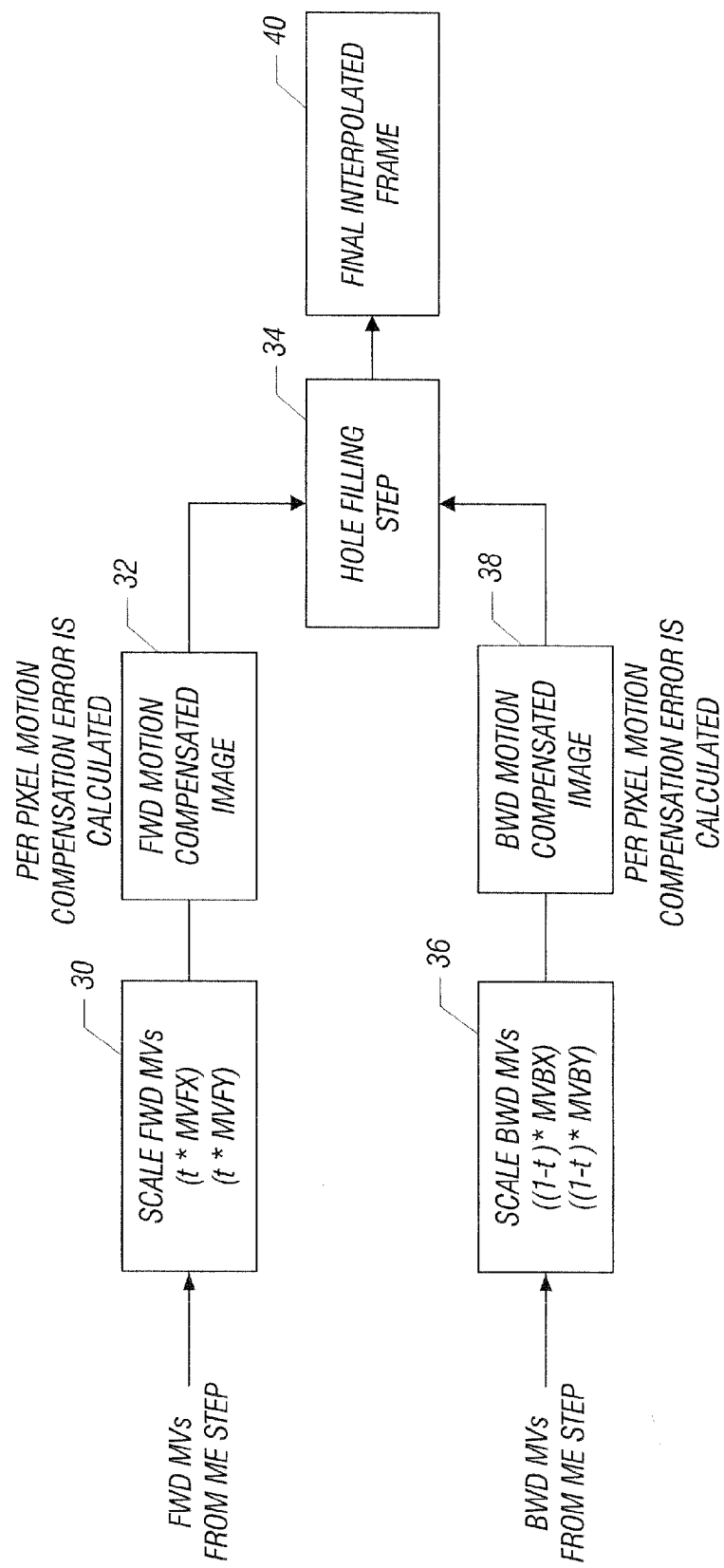
FIG. 4 is a flow chart for frame interpolation in accordance with one embodiment of the present invention.

Referring to FIG. 4, the forward motion vectors from the motion estimation step are provided to block 30 where the forward motion vectors are scaled. Namely, the forward motion vectors may be multiplied by a scaling factor t, and the backward motion vectors are scaled by 1-t in block 36. The scaling factor t scales to the correct time stamp. Next, forward motion compensated image is produced in block 32 where a per pixel motion compensation error is calculated. Likewise, the backward motion compensated image is produced in block 38 as a per pixel motion compensation error is calculated. Next, the hole filling step 34 is done. Finally, the final interpolated frame is produced, as indicated in block 40, and described hereinafter.

Figure 5:
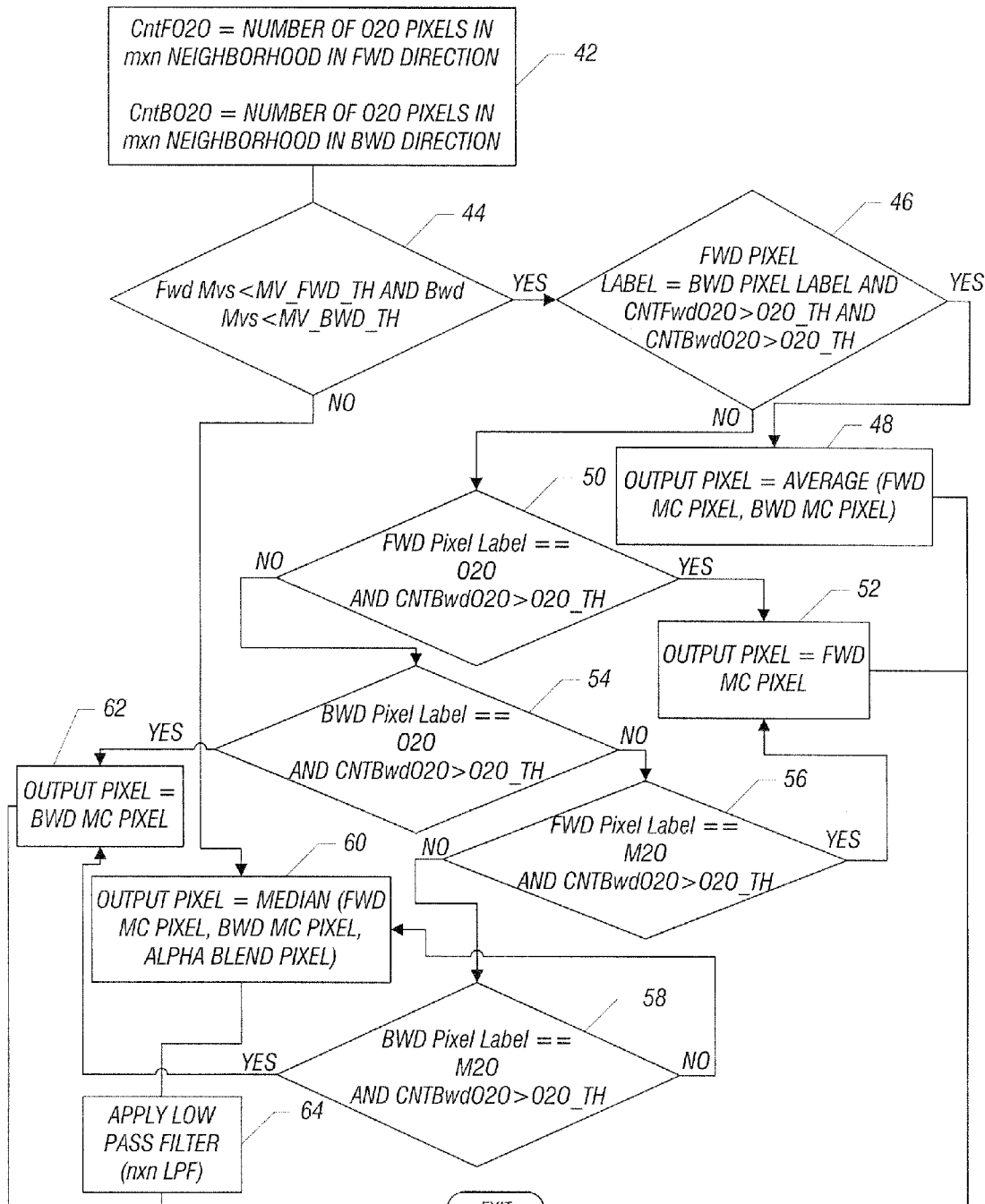
FIG. 5 is a flow chart for final pixel interpolation in accordance with one embodiment of the present invention.

Referring to FIG. 5, the final pixel interpolation begins at block 42, where the number (CNT) of one-to-one (O2O) pixels in the neighborhood of the current pixel is calculated for both the forward (CntFO2O) and backward (CntBO2O) interpolation frames. If the absolute values of the forward (Fwd Mvs) and backward (Bwd Mvs) motion vectors are below a threshold (MV_FWD_TH or MV_BWD_TH) and the pixel labels are not hole pixels, then the pixels are interpolated from the forward and backward interpolated pixel, as indicated in diamond 44.

If the forward motion vectors (Fwd Mvs) are greater than a threshold (MV_FWD_TH), as determined in block 44 and the backward motion vectors (Bwd Mvs) are less than a threshold (MV_BWD_TH), then a check at diamond 46 determines whether the forward pixel label and backward pixel label are the same. For example, they may both be one-to-one pixels. A check at diamond 46 also determines whether the forward count of one-to-one pixels is greater than the threshold and the backward count of one-to-one pixels is greater than the threshold. If this is so, then the output pixel is set equal to the average of the forward motion compensated pixel and the backward motion compensated pixel in block 48. Preference may be given to one-to-one pixels over many-to-one pixels, if the pixels for both the forward and backward interpolated pixels are the same, either for the one-to-one or many-to-one, and then an average pixel value may be used as the final output.

Otherwise, a check at diamond 50 determines whether the forward pixel label is one-to-one and the count of the backward pixels is greater than the one-to-one threshold. If so, the output pixel is set equal to the forward motion compensated pixel in block 52. Otherwise, a check at diamond 54 determines whether the backward pixel label is one-to-one and the count of backward one-to-one pixels is greater than the threshold. If so, the output pixel is set equal to the backward motion compensated pixel in block 62.

Otherwise, a check at diamond 56 determines whether the forward pixel label is many-to-one (M2O) and the count of backward one-to-one pixels is greater than the threshold. If so, the output pixel is set equal to the forward motion compensated pixel in block 62.

Otherwise, a check at diamond 58 determines whether the backward pixel label is many-to-one and the count of backward one-to-one pixels is greater than the threshold. If so, then the output pixel is set equal to the backward motion compensated pixel in block 62. Otherwise, the output pixel is set equal to the median of the forward motion compensated pixel, the backward motion compensated pixel, and an alpha blend pixel in block 60. This is also the result if the forward motion vectors are not less than the forward motion vector threshold and the backward motion vectors are not less than the backward motion vector threshold.

The alpha blended pixel is a blend of the pixels of the neighboring frames at zero motion, weighted by proximity to the time stamp. The blending is done based on where the time stamp is. Based on the distance from the interpolated frame to the previous frame and the distance from the next frame to the interpolated frame, the blending is done accordingly. If the forward and backward motion compensated pixels are the same, then the median will take this value and, otherwise, the median takes the alpha blended pixel value. In either case, a low pass filter is applied in block 64.

In some embodiments, a combination of bi-directional and hierarchical multi-resolution methods of motion compensation with proper handling of special cases, results in detecting bi-directionally compensated versions of the final frame and allows creating interpolated frames of relatively high quality with the absence of typical artifacts resulting from weak motion estimation or interpolation.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   estimating motion between successive frames at a first frame rate by labeling pixels in one frame with respect to the number of matching pixels in another frame and determining a cost function based on a similarity measure between successive frames and the distance of a motion vector to a base motion vector; and
   using said motion estimation and said pixel labeling to interpolate pixels in frames having a second frame rate different from said first frame rate.

2. The method of claim 1 including labeling pixels that have no matching pixels in another frame.

3. The method of claim 1 including labeling pixels that have only one matching pixel in another frame.

4. The method of claim 1 including labeling pixels that have multiple matching pixels in another frame.

5. The method of claim 1 wherein if the cost function is indeterminant, using a previous block above a block in question and a previous block to the left of a block in question to develop said motion vectors.

6. The method of claim 1 wherein said motion estimation is bi-directional.

7. The method of claim 6 wherein said motion estimation is multi-resolution.

8. The method of claim 7 including using a cost function that weights the distance to a matching block and a resolution factor.

9. The method of claim 1 including using a block matching criteria that uses a sum of absolute differences window that is larger than the block size.

10. A non-transitory computer readable medium storing instructions executed by a computer to:
- convert the frame rate of video frames using motion estimation and pixel labeling implemented during motion estimation to interpolate pixels in frames;
- wherein pixel labeling includes labeling pixels based on the number of pixels in a subsequent frame that correspond to pixels in a previous frame; and
- wherein using motion estimation includes choosing the best candidate among four adjacent blocks, which do not share the same motion vector from a lower resolution, as the base motion vector for the next higher resolution.

11. The medium of claim 10 further storing instructions to label pixels with one unique label if the pixels have no matching pixels in a subsequent frame.

12. The medium of claim 10 further storing instructions to label pixels with a unique label if those pixels only match one pixel in a subsequent frame.

13. The medium of claim 10 further storing instructions to label pixels with a unique label if the pixels match multiple pixels in a subsequent frame.

14. The medium of claim 10 further storing instructions to determine a cost function as part of the motion estimation based on a similarity measure between successive frames and the distance of a motion vector to a base motion vector.

15. The medium of claim 14 further storing instructions to use a previous block above a block whose cost function is indeterminant and a previous block to the left of the block whose cost function is indeterminant to develop motion vectors.

16. The medium of claim 10 further storing instructions to implement bi-directional motion estimation.

17. The medium of claim 16 further storing instructions to implement multi-resolution motion estimation.

18. The medium of claim 17 further storing instructions to choose the best candidate among four adjacent blocks, which do not share the same motion vector from a lower resolution, as the base motion vector for the next higher resolution.

19. The medium of claim 10 further storing instructions to count the number of pixels which have only one matching pixel in an ensuing frame and to use that number to determine how to interpolate pixels for said frame rate conversion.

20. An apparatus comprising:
- a motion estimation unit to estimate motion between successive frames at a first frame rate by labeling pixels with respect to the number of matching pixels in a subsequent frame; and
- an interpolation unit to use said motion estimation and said pixel labeling to interpolate pixels in frames having a second frame rate different from said first frame rate, said interpolation unit to count the number of pixels that have only one matching pixel in an ensuing frame and to use that number to determine how to interpolate pixels for frame rate conversion to said second frame rate.

21. The apparatus of claim 20 wherein said motion estimation unit to label pixels that have no matching pixels in a subsequent frame.

22. The apparatus of claim 20, said motion estimation unit to label pixels that have only one matching pixel in a subsequent frame.

23. The apparatus of claim 20, said motion estimation unit to label pixels that have multiple matching pixels in a subsequent frame.

24. The apparatus of claim 20 wherein said motion estimation unit to determine a cost function based on the similarity measure between successive frames and the distance of a motion vector to a base motion vector.

25. The apparatus of claim 24, said motion estimation unit to use a previous block above a block being estimated and a previous block to the left of the block being estimated to develop said motion vectors if the cost function is indeterminant.

26. The apparatus of claim 20 wherein said motion estimation unit is bi-directional.

27. The apparatus of claim 26 wherein said motion estimation unit is multi-resolution.

\* \* \* \* \*